United States Patent [19]

Biglione et al.

[11] Patent Number: 4,959,434

[45] Date of Patent: Sep. 25, 1990

[54] MODIFIED IMPACT-RESISTANT VINYLAROMATIC COPOLYMERS

[75] Inventors: Gianfranco Biglione, Mantova; Savino Matarrese, Verona, both of Italy

[73] Assignee: Montedison S.p.A., Milan, Italy

[21] Appl. No.: 455,762

[22] Filed: Dec. 28, 1989

Related U.S. Application Data

[63] Continuation of Ser. No. 747,223, Jun. 21, 1985, abandoned.

[30] Foreign Application Priority Data

Jun. 22, 1984 [IT] Italy ............................... 21560 A/84

[51] Int. Cl.$^5$ ........................................... C08F 220/44
[52] U.S. Cl. .................................... 526/342; 526/338; 525/64; 525/67; 525/69; 525/148; 525/175; 525/316
[58] Field of Search ................. 526/338, 342; 525/67, 525/64, 69, 148, 175, 316

[56] References Cited

U.S. PATENT DOCUMENTS

| | | | |
|---|---|---|---|
| 2,384,547 | 9/1945 | Fryling | 526/338 |
| 2,450,028 | 9/1948 | Weber et al. | 526/338 |
| 2,459,126 | 1/1949 | Clifford | 526/338 |
| 2,713,562 | 7/1955 | Reid | 526/338 |
| 2,713,566 | 7/1955 | Reid | 526/338 |
| 2,854,439 | 9/1958 | Slocombe et al. | 526/338 |
| 3,118,854 | 1/1964 | Hess, Jr. et al. | 526/338 |
| 3,956,246 | 5/1976 | Griffith et al. | 526/338 |

FOREIGN PATENT DOCUMENTS

| | | | |
|---|---|---|---|
| 55827 | 5/1967 | German Democratic Rep. | 526/338 |
| 7504486 | 10/1975 | Netherlands | 526/338 |
| 621703 | 4/1949 | United Kingdom | 526/338 |
| 751497 | 6/1956 | United Kingdom | 526/338 |

Primary Examiner—Joseph L. Schofer
Assistant Examiner—N. Sarofim
Attorney, Agent, or Firm—Stevens, Davis, Miller & Mosher

[57] ABSTRACT

Modified impact-resistant vinylaromatic copolymers containing from 2 to 10% by weight of an ethylenically unsaturated nutrile and from 0 to 30% by weight of alpha-methyl-styrene and having a gel content higher than 23%, a cracking resistance, in an olive oil/oleic acid mixture under a load of 10 MPa, higher than 100 min., and a melt index below 1.5 g/10 minutes.

2 Claims, No Drawings

MODIFIED IMPACT-RESISTANT VINYLAROMATIC COPOLYMERS

This application is a continuation of application Ser. No. 747,223, filed June 21, 1985, now abandoned.

BACKGROUND OF THE INVENTION

As is known, the impact-resistant vinylaromatic copolymers containing an ethylenically unsaturated nitrile exhibit, as compared with the common or conventional impact-resistant polystyrenes, improved mechanical properties and, above all, a better resistance to cracking under load in the presence of chemical agents, such as, e.g., fluorinated products.

These copolymers are therefore suitable for the manufacture of cells of refrigerators which are to be formed on the back with foamed polyurethane, the foaming agent for which is based on trichlorofluoromethane.

However, these copolymers are not equally satisfactory for utilizations which require a high resistance to high temperatures along with a good cracking resistance in the presence of fatty substances, such as oil, margarine and other fats.

THE PRESENT INVENTION

An object of the present invention is to increase the thermal resistance and, at the same time, improve the cracking resistance of the impact-resistant vinylaromatic copolymers containing an ethylenically unsaturated nitrile in the presence of oils and fats.

Tests conducted by us have proved that, when the polymerization of styrene in the presence of an ethylenically unsaturated nitrile is carried out in the absence of the lubricating compounds usually employed in such polymerization, a simultaneous increase in the thermal resistance and in the cracking resistance in the presence of fatty substances as well as a decrease of the melt index are obtained.

It has been also found that these resistance properties are enhanced when the polymerization of styrene with an ethylenically unsaturated nitrile is conducted in the presence of alpha-methylstyrene.

The present invention provides impact-resistant vinylaromatic copolymers containing from 2 to 10% by weight of an ethylenically unsaturated nitrile, from 0 to 30% by weight of alpha-methylstyrene, and having a gel content higher than 23%, a resistance to cracking, in olive oil/oleic acid mixture in a 50/50 weight ratio and under a load of 10 MPa, higher than 100 minutes and a melt index (200° C./5 kg) below 1.5 g/10 minutes.

Thanks to such properties, the copolymers object of this invention are particularly suitable for use in extrusion processes either alone or in admixture with other polymers compatible therewith.

The following Table 1 shows the above-mentioned characteristics as a function of the copolymer composition. The copolymers were obtained by operating according to the process conditions indicated in the examples.

TABLE I

| COPOLYMER COMPOSITION | UNIT | SAMPLES | | | | | | |
|---|---|---|---|---|---|---|---|---|
| | | 1 | 2 | 3 | 4 | 5 | 6 | 7 |
| Styrene | % by weight | 92 | 92 | 91 | 74 | 74 | 72 | 72 |
| Alpha-methylstyrene | " | — | — | — | — | — | 12 | 12 |
| Acrylonitrile | " | — | — | — | 8 | 8 | 8 | 8 |
| Butadiene | " | 8 | 8 | 9 | 8 | 8 | 8 | 8 |
| Mineral oil | " | — | 2 | 2 | 2.5 | — | 2.5 | — |
| Gel content | % | 21 | 22 | 28 | 28 | 29 | 30 | 30 |
| Vicat B | °C. | 94 | 88 | 86 | 90 | 95 | 92 | 98 |
| Melt index (200° C./g kg) | g/10' | 2.5 | 4 | 3.5 | 2.5 | 1.3 | 1.7 | 0.8 |
| Tensile strength in olive oil/oleic acid (50/50) at 10 MPa | minutes | 20–30 | 20–30 | 10–20 | 70 | 370 | 85 | 410 |

From the data reported in Table I, it is apparent that, when the copolymerization of styrne with an ethylenically unsaturated nitrile is conducted in the absence of mineral oil, generally employed as a lubricant, the resulting copolymers exhibit a remarkable improvement in the stress cracking resistance in oil. Such improvement considerably increases when the copolymerization is accomplished in the presence of alpha methylstyrene.

The copolymers forming the object of this invention, besides being suitable for extrusion, allow to obtain injection molded or extruded and thermoformed articles having a good thermal stability and a good resistance to fats both when they are used alone and when they are used in admixture with other polymers compatible with said copolymers, such as polycarbonates polybutylenterephthalate, polyethyleneterephthalate, etc.

The presently preferred unsaturated nitrile is acrylonitrile. Also other ethylenically unsaturated monomers such as methacrylonitrile are advantageously employable.

The impact-resistant vinylaromatic copolymers object of the present invention can be obtained according to any known polymerization process, provided a mixture of vinylaromatic/ethylenically unsaturated nitrile monomers is employed, optionally in the presence of alpha-methylstyrene, as starting monomers, and provided the polymerization is conducted in the absence of lubricating oils and the stirring system is adjusted during polymerization in such manner as to obtain the characteristics cited hereinbefore.

The most common polymerization processes are, as is known, suspension polymerization, the mass suspension polymerization and continuous mass-polymerization, which processes are broadly described in literature, such as, e.g., in U.S. Pat. Nos. 2,694,692 and 2,862,906; in Amos, Polymer Eng. Sci. 14 (1974) 1, pages 1–11.

According to the mass suspension process, rubber is first dissolved in the mixture of styrene/unsaturated nitrile monomers or of styrene/alpha-methylstyrene/unsaturated nitrile monomers, and the mass is subjected to a thermal or catalytic polymerization till obtaining a conversion of 30% and generally not higher than 50%. After this first prepolymerization step, the mass is dispersed, under intense stirring and by means of suspending agents, in water and is subjected to polymerization according to a proper and well known thermal cycle.

The nitrile monomer can be added in whole or in part prior to or during the polymerization.

The reaction temperature may range from 50° to 170° C. and is preferably from 100° to 160° C.

Polymerization is generally accomplished in the presence of oil-soluble catalysts, which can be added either at the beginning of the polymerization or during same. Suitable catalysts are benzoyl peroxide, lauryl peroxide, dicumyl peroxide, di-ter.butyl peroxide, etc.

Prepolymerization can be also started thermally. If so desired, it is possible to use a chain transfer agent, such as, for example, terdodecylmercaptane or the like.

As suspending agents it is possible to use both water-soluble organic compounds such as polyvinyl alcohol, acrylic copolymers, cellulose derivatives, partially saponified polyvinyl acetate, etc., or water-insoluble inorganic compounds, such as tricalcium phosphate, barium sulphate, etc., either alone or in admixture with a surfactant or sodium sulphite. The suspending agents are generally employed in an amount ranging from 0.1 to 5% by weight in respect of the organic phase.

Polymerization can be conducted also directly in suspension without prepolymerization in mass, provided the stirring of the reaction mass is accomplished in such manner as to obtain the copolymers having the above-cited characteristics.

According to the continuous mass processes, the rubber solution of the monomer mixture is continuously fed to and polymerized in reactors arranged in series and subjected to stirring, according to a well defined temperature cycle, up to a conversion above 50%.

The mass is then devolatilized under vacuum to remove the unreacted monomers, which are suitably recycled to the first reactor.

The polymerization is generally carried out by means is ethylbenzene.

The temperature ranges from 50° to 240° C. and preferably from 100° to 220° C.

Employable rubbers are both the natural rubbers and the synthetic rubbers which are utilized to impart impact resistance to the vinylaromatic polymers. Suitable synthetic rubbers are polybutadiene, polyisoprene, the copolymers of butadiene and or of isoprene with styrene or With other monomers, etc., which exhibit a glass transition temperature (Tg) lower than −20° C. These butadiene and/or isoprene polymers may contain the monomers in different configurations, for example, a different content of configuration cis, trans and Vinyl.

Other synthetic rubbers utilizable in the preparation of the modified impact-resistant vinylaromatic copolymers of the present invention, are saturated rubbers of the ethylenepropylene type or ethylene-propylene-diene terpolymers, silicone rubbers with unsaturated groups, etc.

The vinylaromatic copolymers of this invention are employable as such or they can be additions with specific additives for the production of the self-extinguishing, antistatic, antiscratching, semiexpandible, sunlight-resistant types, etc.

In order to determine the characteristics of the vinylaromatic copolymers of the present invention, the following methods were adopted:

1. Determination of the toluene-insoluble elastomeric phase (gel content)

A 2 g sample was dispersed in 100 cc of a mixture consisting of 57% by weight of toluene and 43% by weight of methylethylketone. After centrifugation at 10,400×G, the insoluble portion was separated by decantation in the form of a swollen gel. The gel was repeatedly washed with the above-mentioned toluene/methylethylketone mixture and centrifuged until the washing solvent became turbid due to addition of ethanol. The swollen and washed gel was coagulated with ethanol, was separated by filtration and dried at 45° C. under vacuum at 200 mm of Hg for 12 hours. The content of toluene-insoluble elastomeric phase was calculated according to the equation:

$$\text{Content in \%} = \frac{\text{Weight of dried gel}}{2} \cdot 100$$

2. Softening temperature VICAT B (5 kg in oil)

Said softening temperature was determined according to ISO 306 standard, using injection molded 3.2 mm thick test pieces.

3. Melt Index

The melt index was determined according to ASTM D 1238 standard, at 200° C. and 5 kg.

4. Cracking resistance under load was determined on 2.1 mm thick test pieces having shape and size according to ASTM D 2552 (Environmental Stress Cracking). The test pieces were prepared by milling of injection molded plates, subjected to compression in a press at a temperature of 180° C. and a pressure of 160 kg/cm² for 6 minutes. The cooling rate was about 10° C./1 minute. Said test pieces were subjected to tensile stress with a constant load of 10 MPa (creep) during immersion in a 50/50 by weight mixture of olive oil/oleic acid. The cracking resistance was given by the time required to break the test piece.

The following examples are given to illustrate the invention in more detail and are not limiting.

EXAMPLES 1 to 3

A reactor equipped with an anchor stirrer, a reflux cooler and a thermometer was fed, under continuous stirring, with:

a monomer mixture of the type and in the amounts as indicated in Table II;

polybutadiene rubber having a 1–4 cis content of 35% and a Mooney viscosity of 35, in the amount indicated in Table II, and 0.1% by weight of ter.butylperbenzoate, as polymerization starter.

After removal of the oxygen contained in the reactor by means of nitrogen flushing, the mixture was subjected to a mass-prepolymerization at 110° C. during 4 hours, till obtaining a conversion of about 30%.

The prepolymerization syrup was transferred into an autoclave equipped with an impeller stirrer and containing water in a water/monomer+rubber weight ratio of 1:1. About 0.5% by weight, referred to water, of a suspending agent consisting of acrylic acid/2-ethylhexylacrylate copolymer in a ratio by weight of 95:5 was added.

After addition of 0.2% by weight, with respect to the monomers/rubber mixture, of ter.butylperbenzoate, the mixture dispersed in water in the form of droplets was polymerized at 115° C. during 4 hours. Successively there were added 0.1% of ter.butylperbenzoate, and polymerization was carried on at 140° C. for 2 hours till obtaining the complete conversion of the monomers to polymer.

The copolymer so obtained was separated by centrifugation, repeatedly washed with water and dried at 80° C. The resulting copolymer beads were activated with 0.15% by weight of a phenolic antioxidant and transformed to granules by extrusion.

Composition and properties of the copolymer so obtained are indicated in Table II.

TABLE II

|  | UNIT | EXAMPLES | | |
| --- | --- | --- | --- | --- |
|  |  | 1 | 2 | 3 |
| Styrene | % by weight | 76. | 72. | 64. |
| Alpha-methylstyrene | " | 8. | 12. | 20. |
| Acrylonitrile | " | 8. | 8. | 8. |
| Polybutadiene rubber | " | 8. | 8. | 8. |
| Ter.butylperbenzoate | " | 0.4 | 0.4 | 0.4 |
| Gel content | % | 28. | 30. | 34. |
| Vicat temperature | °C. | 96 | 100 | 102 |
| Melt Index | g/10' | 0.9 | 0.7 | 0.4 |
| Cracking resistance | minutes | 320. | 410. | 400. |
| in oil/oleic acid (50/50 by weight) under a load of 10 MPa | | | | |

We claim:

1. An impact-resistant styrene copolymer containing from 2 to 8% by weight of an ethylenically unsaturated nitrile and from 8 to 30% by weight of alphamethylstyrene and having a gel content higher than 23%, a cracking resistance, in an oil/oleic acid mixture in a 50/50 ratio by weight and under a load of 10 MPa higher than 100 minutes, a melt index (200° C./5 kg) lower than 1.5 g/10 minutes and obtained by polymerization carried out in the absence of lubricating oils.

2. An modified impact-resistant vinylaromatic copolymer according to claim 1, in which the ethylenically unsaturated nitrile is acrylonitrile.

* * * * *